(12) United States Patent
Baldwin et al.

(10) Patent No.: US 9,106,821 B1
(45) Date of Patent: Aug. 11, 2015

(54) CUES FOR CAPTURING IMAGES (71) Applicant: Amazon Technologies, Inc., Reno, NV (US)

(72) Inventors: Leo Benedict Baldwin, San Jose, CA (US); Philip Scott McClendon, Santa Clara, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 150 days.

(21) Appl. No.: 13/802,049

(22) Filed: Mar. 13, 2013

(51) Int. Cl.
*H04N 5/232* (2006.01)
(52) U.S. Cl.
CPC ....... *H04N 5/23203* (2013.01); *H04N 5/23219* (2013.01); *H04N 5/23222* (2013.01)
(58) Field of Classification Search
CPC .......... H04N 5/23203; H04N 5/23219; H04N 5/23222
USPC .................. 348/14.12, 207.99, 207.1, 222.1, 348/333.01–333.04, 333.11; 396/77, 283; 382/190; 701/209
See application file for complete search history.

(56) References Cited

U.S. PATENT DOCUMENTS

| | | | |
|---|---|---|---|
| 2008/0205869 A1* | 8/2008 | Nose | 396/77 |
| 2009/0076723 A1* | 3/2009 | Moloney | 701/209 |
| 2009/0079844 A1* | 3/2009 | Suzuki | 348/222.1 |
| 2009/0237521 A1* | 9/2009 | Nishijima | 348/222.1 |
| 2010/0266206 A1* | 10/2010 | Jo et al. | 382/190 |
| 2010/0315485 A1* | 12/2010 | Song et al. | 348/14.12 |
| 2011/0008036 A1* | 1/2011 | Takatsuka et al. | 396/283 |
| 2011/0050976 A1* | 3/2011 | Kwon | 348/333.04 |
| 2011/0317031 A1* | 12/2011 | Honda | 348/229.1 |
| 2012/0057039 A1* | 3/2012 | Gardiner et al. | 348/222.1 |

\* cited by examiner

*Primary Examiner* — Dennis Hogue
(74) *Attorney, Agent, or Firm* — Novak Druce Connolly Bove + Quigg LLP (57) ABSTRACT

Approaches are described which enable a user of a computing device (e.g., mobile phone, tablet computer) to capture a first image using the front-facing camera and then use that first image to guide the capturing of a second image (e.g., a higher quality image) using the rear-facing camera of the device. When the user turns the device around, the first image is used as a model template to guide the user in moving and/or rotating the device to align the rear-facing camera for capturing the second image.

25 Claims, 5 Drawing Sheets

CUES FOR CAPTURING IMAGES

BACKGROUND

Consumers are increasingly relying on devices that are portable and easy to carry, such as smart phones and tablet computers. These devices often include a front-facing camera located on the device as well as a rear-facing camera. Conventionally, the front-facing camera is well suited for self-portraits with framing and expression visible in the display, while the rear-facing camera often takes better images due to enhancements such as an autofocus lens, a higher quality lens, a higher-resolution sensor, a sensor with high dynamic range (HDR) imaging modes, and being equipped with a flash for low-light situations.

Due to the various enhancements of the rear-facing camera, users sometimes use or at least attempt to use the rear-facing camera to capture self-portraits. However, this can be tedious for a user because there is generally no display screen on the back of the device and the shutter activation input (e.g., button, touch screen element, etc.) is usually located on the front of the device. This can leave a user guessing as to what is actually being captured by the rear-facing camera. In addition to being generally inconvenient, attempting to capture an image in this way may introduce blur or other disturbance caused by a user's fingers when the user is trying to activate the shutter on the opposite side of the device. The less than optimal alternative is to photograph one's self in a mirror.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for capturing images using cameras and/or other imaging devices. In particular, various approaches discussed herein enable a user to capture a first image using the front-facing camera of a computing device (e.g., mobile phone, tablet computer) and then use that first image to guide the capturing of a second image (e.g., a higher quality image) using the rear-facing camera of the device. As the user turns the device around, the first image can be used as a model template to guide the user in moving and/or rotating the device in order to help align the rear-facing camera for capturing the second image.

In accordance with an embodiment, as the user moves (e.g., rotates) the computing device, the device can compare the first image to at least a portion of the image data (e.g., video stream) continuously and/or periodically being captured by the rear-facing camera. This can be involve, for example, performing a normalize correlation between the first image and the image data captured by the rear-facing camera. Based at least in part on the comparison, the computing device can provide feedback to a user indicating when the alignment between the images is increasing and/or decreasing, as well as an extent to which the alignment is increasing and/or decreasing. The feedback may be audible, visible, or tactile, such as vibrations, light, or audio output. For example, the device may begin to vibrate when at least a fraction of one of the images in the image data being acquired by the rear-facing camera becomes aligned with at least a fraction of the first image. As the alignment between the images increases, the computing device can increase the intensity of vibration until adequate alignment is reached. Similarly, as the alignment decreases, the device can decrease the intensity of vibration. Alternatively, the computing device may increase or decrease the frequency/intensity of audio output (e.g., beeping rate) as the images become closer aligned, or can increase or decrease the brightness or blinking frequency of at least one light emitting diode (LED) or other light output device or display element of the device. This can provide a user with an intuitive guide to rotate the device so as to position the rear-facing camera in substantially the same direction, angle and/or perspective as the front-facing camera at the time of capturing the first image. In alternative embodiments, the feedback to the user may be inverse with respect to the change in alignment, such as by gradually decreasing the intensity of vibration or sound as the alignment increases.

In various embodiments, when the alignment reaches a minimum threshold, the computing device may capture the second image (i.e. "snap" the picture) using the rear-facing camera and persist the second image into memory of the computing device (e.g., non-volatile memory). In one embodiment, the computing device may discontinue the feedback (e.g., cease vibrating) prior to capturing the second image in order to allow the image to be captured without any interference from the feedback. Alternatively, the feedback may continue while the picture is being captured. In some embodiments, the computing device may capture the image automatically in response to detecting that the degree of alignment between the images has reached a sufficient level. In other embodiments, the computing device may receive input from the user (e.g., by pressing a button) before capturing the second image and persisting the second image into memory.

Figure 1A:
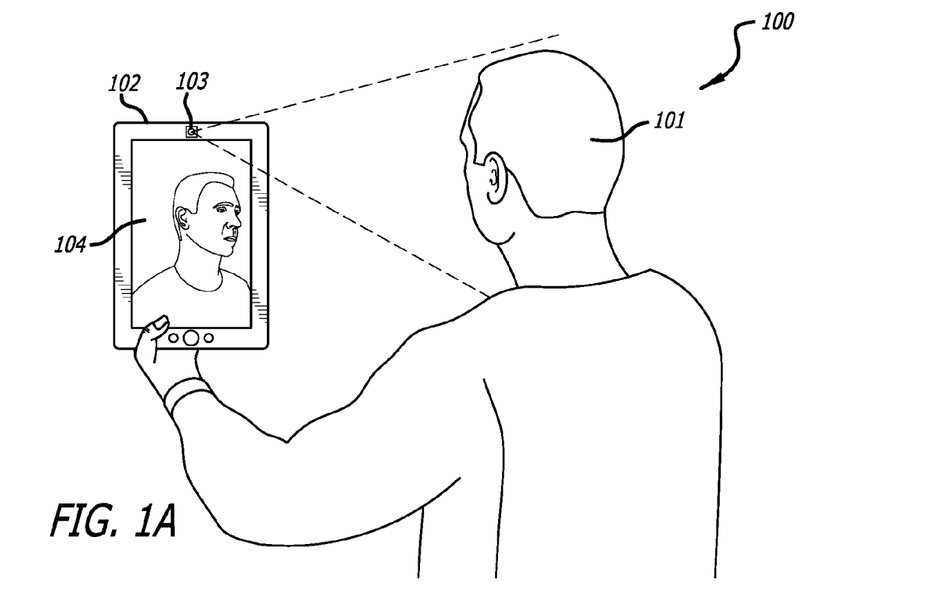
FIG. 1A illustrates an example where a user is holding the computing device to point the front-facing camera in a desired direction in order to capture the first image with a desired camera perspective, in accordance with various embodiments.
Figure 1B:
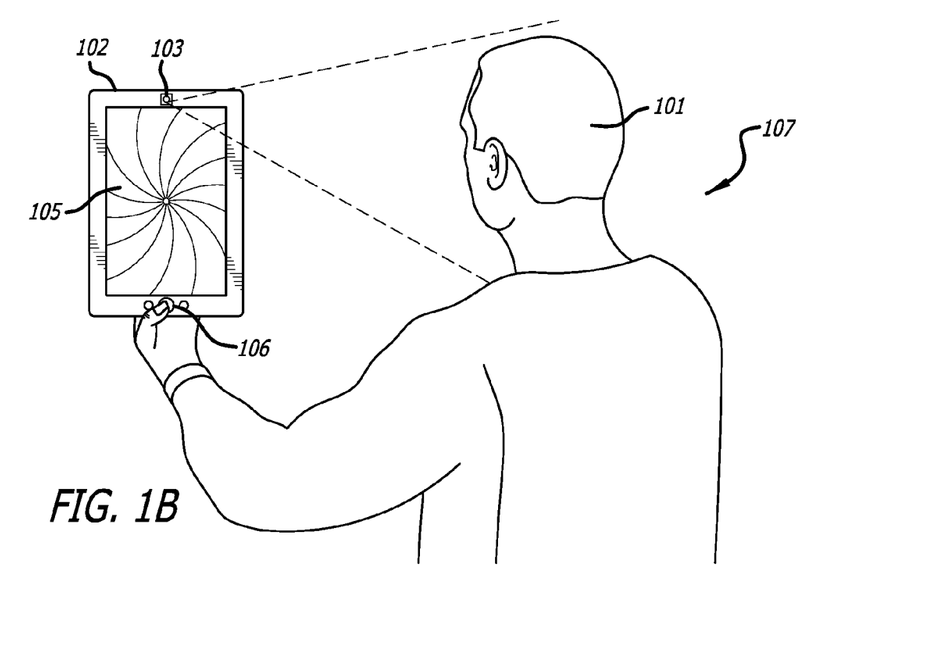
FIG. 1B illustrates an example where a user activates a shutter of the front-facing camera to capture the first image using the front-facing camera, in accordance with various embodiments.

FIGS. 1A and 1B illustrate an example of a user using the front-facing camera of a computing device to capture an image that will be used to later guide the rear-facing camera, in accordance with various embodiments. In this example, the computing device is a tablet computer 102, however it is noted that in alternative embodiments, any computing device can be used, including but not limited to mobile phone, an electronic reader (e-reader), a dedicated camera, or the like.

In particular, FIG. 1A illustrates an example 100 where the user is holding the computing device 102 to point the front-facing camera 103 in a desired direction in order to capture the first image with a desired camera perspective. The user 101 can intuitively rotate the device 102 to point the front-facing camera 103 in the desired direction based on seeing a display of his own image being displayed on the touch screen 104 of the device. As the device is being rotated or moved, the image data (e.g., video stream) being acquired by the front-facing camera changes and the display of the image on the touch screen (e.g., "live view") changes corresponding to the movement. This provides the user with a preview of the image and allows the user 103 to point the device 102 in a direction that will produce the desired image.

FIG. 1B illustrates an example 107 where the user 102 activates the shutter of the front-facing camera 103 to capture the first image using the front-facing camera. For example, when the user is satisfied with the preview of the image, he may press a button 106 or touch screen interface element to activate the shutter of the front-facing camera 103. In response to the user's input, the computing device 102 captures an image (e.g., "snaps" the picture) using the front-facing camera 103. The device 102 may also display an indication to the user that the image is being captured, such as by displaying an image of a closing shutter on the display screen 105.

In some embodiments, the computing device may present the user with one or more interface elements (e.g., on the touch screen display) or other input mechanism that enable the user to indicate that the first image will be used as a template to guide the rear-facing camera. This input can be provided by the user before, during or after capturing the first image. For example, after capturing the image, the user may select the image and select, from a menu, an input option to use the image for guiding the rear-facing camera. As another example, the user may activate a touch screen element in the "live view" displaying a preview of the image, where the touch screen element causes the first image to be captured and used to guide the rear-facing camera.

Figure 2:
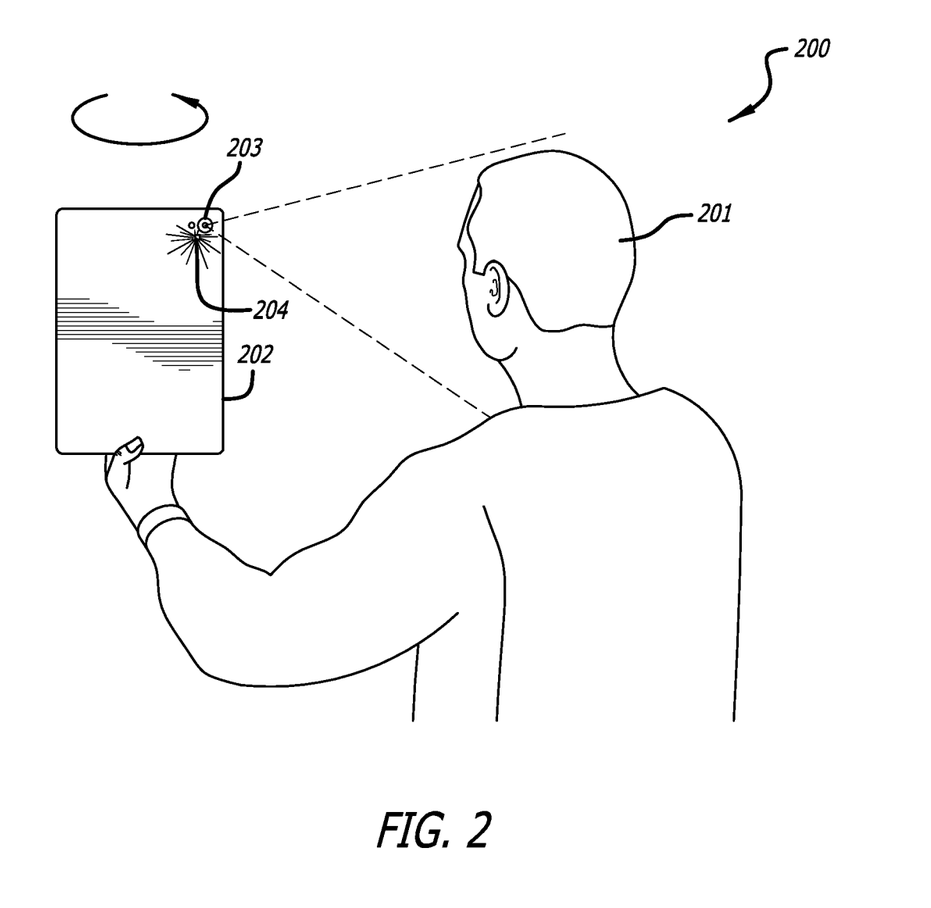
FIG. 2 illustrates an example of a user rotating the computing device and using the rear-facing camera to capture the second image, in accordance with various embodiments.

FIG. 2 illustrates an example 200 of a user rotating the computing device and using the rear-facing camera to capture the second image, in accordance with various embodiments. As illustrated in this example, once the first image has been captured, the user 201 can turn the computing device 202 around to use the rear-facing camera 203. When the computing device 202 is rotated, the device can detect image data (e.g., video stream) being captured by the rear-facing camera 203 during movement or rotation of the computing device. The computing device 202, can analyze the captured image data by comparing the images in the incoming image data to the first image that was captured by the front-facing camera. Since the image data is comprised of a sequence of images, the device may compare each image in the sequence of incoming images to the first image, such as by performing normalized correlation between the images, performing face detection/face recognition or by performing any other technique for comparing images. In one embodiment, normalized correlation can be performed to measure the similarity between the first image captured by the front-facing camera and the images being captured by the rear-facing camera. For example, normalized correlation can be used for template matching, such as by selecting a portion of the first image and then attempting to match it to a portion of the image being captured by the rear-facing camera. Normalized correlation techniques are well known to one of ordinary skill in the art. However, the various embodiments described herein are not limited to normalized correlation and any number of image correlation and/or pattern recognition techniques can be utilized by the computing device to compare the captured image data to the first image. For example, if the first image contains a human face, the computing device may perform facial detection and/or facial recognition to compare the images. In particular, the computing device may identify a set of features or feature points on the face (e.g., eyes, nose, lips, forehead, etc.) and their relative location coordinates (e.g., X and Y coordinates) in the image. When the images acquired by the rear-facing camera 203 also contain the identified features, the device 202 may compare the location coordinates of the features between the first image and the acquired image data to determine a degree of alignment between the images. By focusing on selected features in this manner, the device may determine alignment of images even if the background in the image has changed, such as in cases where there are moving objects in the background. In other embodiments, the comparison may not focus on any particular features and may instead include the entire image or portion thereof.

Based on comparing the image data to the first image, the computing device 202 can provide, to a user, feedback corresponding to the movement (e.g., rotation) of the computing device 202, where the feedback indicates when the alignment between the first image and the image data acquired by the rear-facing camera is increasing and/or decreasing. For example, when the device 202 detects that the image captured by the rear-facing camera matches at least a minimum portion of the first image (or a minimum number of features in the first image), the computing device 202 may begin to vibrate. As the alignment between the image data and the first image increases, the device 202 may increase the intensity of vibration. Similarly, as the alignment decreases, the device may reduce the intensity of vibration. This provides a user with an intuitive guide to point the camera in the correct direction to capture the second image. In various embodiments, the vibration can be produced by any vibration device embedded into the computing device, such as a vibration alert motor of a mobile phone where the motor includes an unbalanced weight causing the vibrations.

In an alternative embodiment, the computing device may provide audio output, such as beeping or other tones, as feedback to the user. For example, the device may increase the beeping rate (similar to a Geiger counter) when the degree of alignment between the images is increasing and reduce the beeping rate when the degree of alignment is decreasing. The audio output can be produced by any sound producing device embedded into the computing device, such as an audio speaker of a mobile phone. In alternative embodiments, the beeping rate and/or vibration can be inversed with respect to the degree of alignment, such that the rate of feedback is decreased when the degree of alignment increases.

In yet another embodiment, the computing device may include a light output device 204, such as one or more light emitting diodes (LEDs) and the feedback provided to the user may be visual, such as light produced by the light output device. For example, the computing device may gradually increase the frequency of blinking the light output device 204, or may gradually increase the intensity of the light produced by the light output device 204 as the alignment between the images is increasing. Similarly, as the alignment decreases, the frequency or intensity of the light produced by the light output device 204 may be decreased.

In accordance with an embodiment, when the computing device 202 detects that the alignment between the first image and the image data acquired by the rear-facing camera has reached a sufficient level (e.g., a predetermined minimum threshold), the computing device may capture the second image and persist the second image into non-volatile memory, such as flash memory, hard disk or the like. For example, when at least a minimum portion of the first image is determined to match a corresponding portion of the image data, the computing device may snap the second image and store the second image into flash memory of the computing device. The minimum threshold or bounds may be set in order to prevent the user from becoming frustrating with precisely aligning the pixels of the images. For example, the threshold may be set such that the images must match within at least 10% of the frame before the second image is captured.

The second image is captured using the rear-facing camera. To prevent any interference from the vibrations, the device may discontinue the vibration prior to capturing the second image. As such, from the user's perspective, the device would continue to increase in vibration intensity until adequate alignment is reached, at which point the vibration would stop, indicating to the user to stop rotating/moving the device. At this point the second image would be captured using the rear-facing camera.

In various embodiments, some or all of the enhancements provided with the rear-facing camera (which are not included in the front-facing camera) can be utilized to capture the second image. For example, the second image can be autofocused, which is not conventionally provided with front-facing cameras. If the lighting conditions are low, the flash (or other illumination device) is activated to provide light to the second image. If the rear-camera is equipped with high dynamic range (HDR) imaging, the HDR imaging can be invoked to capture the second image. Additionally, because the rear-facing camera often includes a higher quality lens and a higher resolution imaging sensor, the second image may be a higher quality image than the first image captured using the front-facing camera.

In some embodiments, the capturing of the second image using the rear-facing camera is performed automatically in response to detecting that the degree of alignment between the images is sufficiently high. In other embodiments, the device may receive input from a user before capturing the second image. For example, a side button of the computing device may be re-purposed to function as a shutter button that causes the rear-facing camera to capture an image. In this example, the user would rotate/move the device until adequate alignment is reached and then press the side button to capture the second image. In various alternative embodiments, the input can be provided by using other buttons, graphically displayed touch screen interface elements and the like.

In some embodiments, if the front-facing camera has a different field of view (FOV) from the rear-facing camera, the computing device can crop the second image to match the dimensions of the image captured by the rear-facing camera more precisely to the dimensions of the first image. Typically the rear-facing camera has at least the same field of view as the front camera and, in many cases, the rear-facing camera has a slightly wider FOV. As such, the computing device may either crop the second image which would contain slightly more scene than the first image, or simply allow the extra scene to remain in the second image.

In some embodiments, data obtained by the accelerometer and/or gyroscope can be used by the computing device to guide the user into pointing the device in a horizontal direction. The accelerometer/gyroscope data can be used to detect when the bottom of the device is pointing down and based on that provide an indication to the user to straighten the camera, similarly to the feedback previously described. In some embodiments, a different feedback signal can be used to guide the user in leveling the camera because there may be a difference between aligning the images and making the camera straight in terms of the horizontal direction. For example, if the computing device is using vibrations to guide the alignment of the images, audio output can be used to cue the user when the camera is level.

In accordance with an alternative embodiment, rather than capturing the first image using the front-facing camera, the first image may also be captured using the same rear-facing camera that will be used to capture the second image. For example, if the computing device does not include a front-facing camera, the user may utilize the rear-facing camera to take a first image (e.g., a self-portrait). The user may then inspect the image and manipulate the image (e.g., recompose the image) using the touchscreen to make an adjustment to a location of an object in the image, move the image, adjust the center, focus and otherwise make the image appear as desired. For example, the user may place a finger on an object (or area of interest) in the first image (e.g., a person's face) and then drag that object to the center of the display screen (or some other desired location on the screen). This can indicate to the device that the user would like for that object to be the focus of the second image and that the second image should contain that object in the center of the second image. In some embodiments, as the user drags the object to the desired location on the screen, the display screen may adjust the displaying of the first image to fill in the unknown portion of the screen with black or gray areas where the camera does not have image data about the portion outside of the frame of the first image. In other embodiments, the adjusting of the first image may not move the first image but simply draw a circle (or other pattern) around the object and/or the desired ending location (e.g., center). Once the image is adjusted, the computing device can use the adjustments to the image (e.g., modified object location, etc.) to provide feedback to the user when capturing a second image using the rear-facing camera, as described throughout this disclosure. For example, the device may analyze the image data being acquired by the device and determine the location of the object in the image data. When the location of the object in the image data is becoming aligned with the user's modified location, the device may increase the vibrations or other feedback. In this particular embodiment, only a single camera is necessary to enable the device to use one image to guide the capturing of a second image. As such, this embodiment may be particularly useful with dedicated camera devices that often do not include a front-facing camera.

In another alternative embodiment, rather than using a first image to cue the second image, the computing device (e.g., mobile phone, dedicated camera, etc.) may apply a head tracking algorithm to determine when the persons face is coming within a threshold distance of the center (or other specified location) on the screen and provide feedback accordingly, as described throughout this disclosure. For example, as the persons head is getting closer to the center, the camera may increase vibrations until it is within a threshold distance and then automatically capture the image, as previously described. In some embodiments, this embodiment can be complimentary to the user manipulating the image to specify an adjustment to the location of the object in the first image. For example, the device may have a default mode where the device uses head tracking to provide feedback to the user when the head of a person is getting closer to the center of the image. Once that first image is captured, the user may manipulate the image to reposition the object and the device may then use the user's input to cue the capturing of the second image, as previously described.

Figure 3:
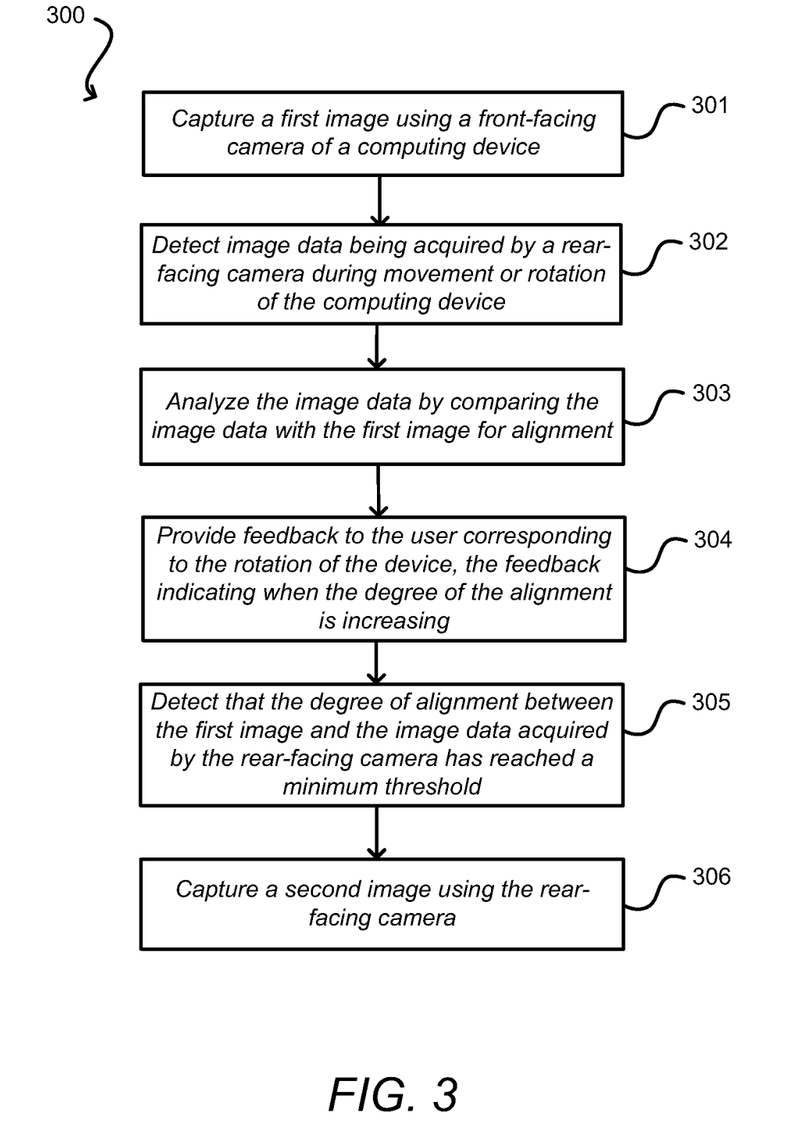
FIG. 3 illustrates an example of a process for using an image captured by a front-facing camera to guide image capturing using the rear-facing camera, in accordance with various embodiments.

FIG. 3 illustrates an example of a process 300 for using an image captured by a front-facing camera to guide image capturing using the rear-facing camera, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways. It also should be understood that terms such as "front-facing" and "rear-facing" are used for purposes of explanation and should not be interpreted as requiring a specific orientation unless otherwise stated, as any camera elements on opposing sides, or in opposing directions, for a device can take advantage of techniques discussed within the scope of the various embodiments.

In operation 301, a first image is captured using a front-facing camera of a computing device. For example, the first image may be a self-portrait of a user holding a mobile phone or tablet computer having a front-facing camera. This first image will be used to guide or cue the user in taking a second image using the rear-facing camera of the computing device.

In operation 302, once the user turns the device around, the device detects image data being captured by the rear-facing camera as the device is being rotated or moved. The image data includes a sequence of images, such as the video stream in the "live view" of the computing device. In operation 303, the device analyzes the image data captured by the rear-facing camera by comparing the image data to the first image that was captured using the front-facing camera. In one embodiment, normalized correlation is performed between the first image and the images in the image data to determine alignment between the images.

In operation 304, the computing device provides feedback based on the comparing of the image data to the first image. The feedback corresponds to the movement/rotation of the computing device and indicates to the user when the alignment between the images is increasing or decreasing. For example, as previously mentioned, the feedback may comprise one or more vibrations or audio output that increases in intensity and/or frequency as the alignment between the images increases.

In operation 305, the computing device detects when the alignment between the first image and the image data acquired by the rear-facing camera has reached a minimum predetermined threshold. In operation 306, the device captures a second image using the rear-facing camera in response to the detection that the alignment has reached the minimum threshold and persists the second image in memory (e.g., non-volatile memory of the computing device). As previously described, the capturing of the second image can be performed automatically or in response to input received from a user.

Figure 4:
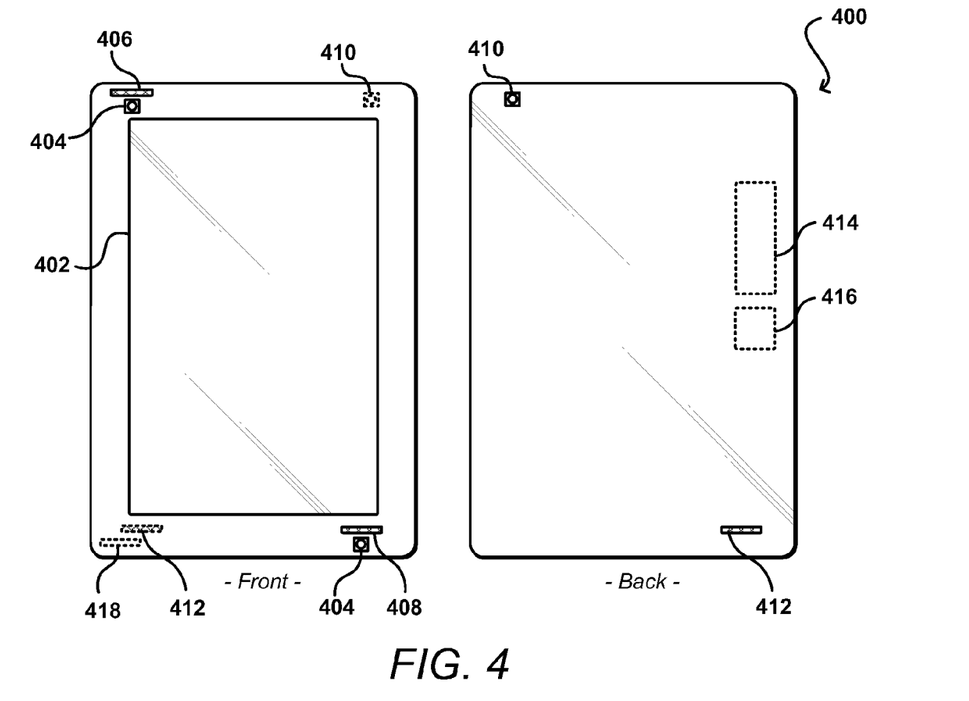
FIG. 4 illustrates front and back views of an example portable computing device that can be used in accordance with various embodiments.

FIG. 4 illustrates front and back views of an example portable computing device 400 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, dedicated cameras, personal data assistants, cellular phones, video gaming consoles or controllers, and portable media players, among others.

In this example, the portable computing device 400 has a display screen 402 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 410 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements (i.e., cameras) for purposes such as conventional image and/or video capture. The image capture elements can also be used for purposes such as to determine motion and receive gesture input. While the portable computing device in this example includes one image capture element 404 on the "front" of the device and one image capture element 410 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 406 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 400 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 414, such as may include at least one wired or wireless component operable to communicate with one or more portable computing devices. The device also includes a power system 416, such as may include a battery operable to be recharged through conventional plug-in approaches, or through other approaches such as capacitive charging through proximity with a power mat or other such device. Various other elements and/or combinations are possible as well within the scope of various embodiments.

Figure 5:
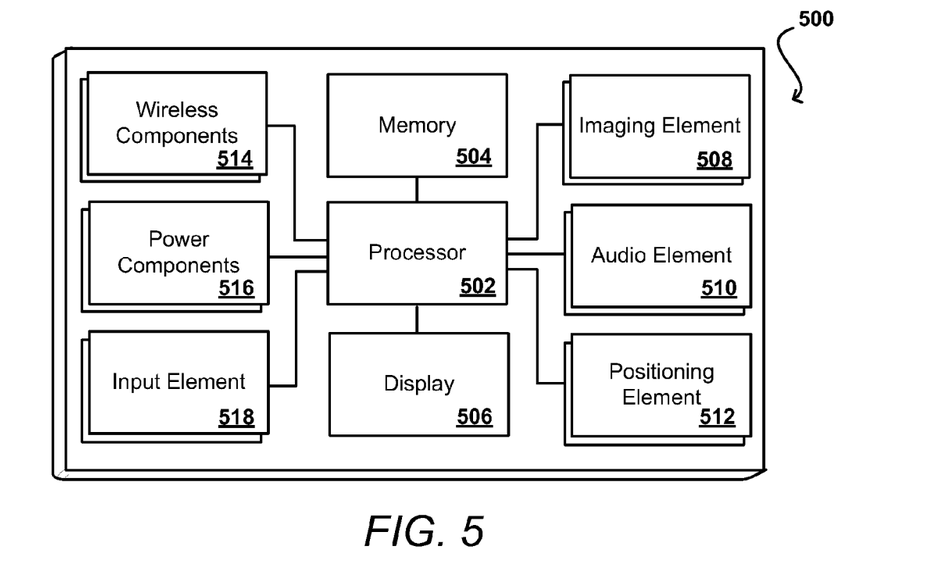
FIG. 5 illustrates an example set of basic components of a portable computing device, such as the device described with respect to FIG. 4.

In order to provide functionality such as that described with respect to FIG. 4, FIG. 5 illustrates an example set of basic components of a portable computing device 500, such as the device 400 described with respect to FIG. 4. In this example, the device includes at least one processor 502 for executing instructions that can be stored in at least one memory device or element 504. As would be apparent to one of ordinary skill in the art, the device can include many types of memory, data storage or computer-readable storage media, such as a first data storage for program instructions for execution by the processor 502, the same or separate storage can be used for images or data, a removable storage memory can be available for sharing information with other devices, etc.

The device typically will include some type of display element 506, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 508, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 510, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 512 that provides information such as a position, direction, motion, or orientation of the device. This positioning element 512 can include, for example, accelerometers, inertial sensors, electronic gyroscopes, electronic compasses, and GPS elements.

The device can include at least one additional input device 518 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 514 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 516 known in the art for providing power to a portable computing device, which can include capacitive charging elements for use with a power pad or similar device as discussed elsewhere herein. The example device also can include at least one touch and/or pressure sensitive element 518, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 6:
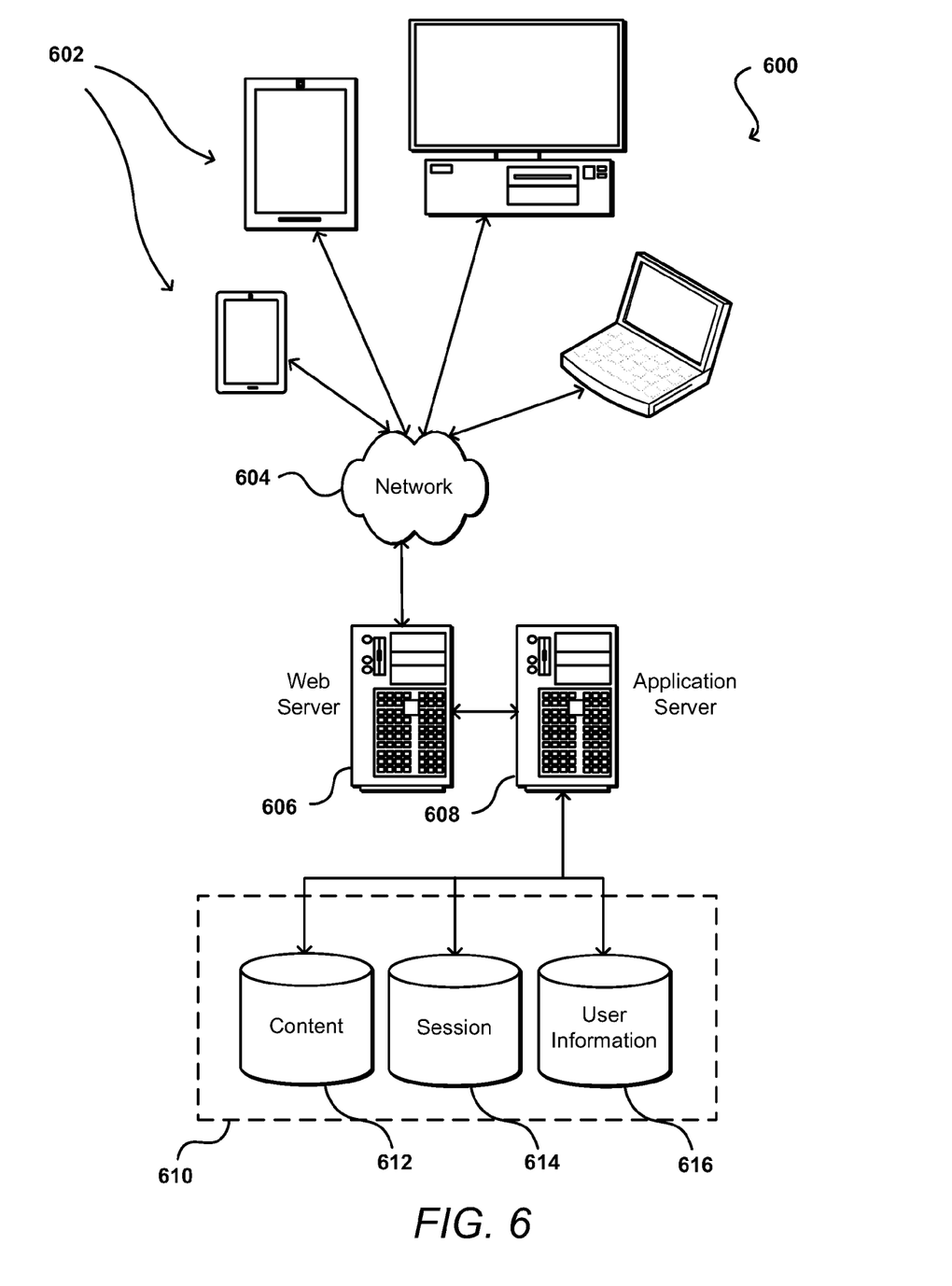
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 608 can include any appropriate hardware and software for integrating with the data store 610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 606 in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., production data) 612 and user information 616, which can be used to serve content for the production side. The data store is also shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the client device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computing device, comprising:
a display screen positioned proximate to a front side of the computing device, the display screen configured to display visual information to a user;

a front-facing camera positioned proximate to the front side of the computing device;
a rear-facing camera positioned proximate to a rear side of the computing device that is opposite with respect to the front side;
at least one processor; and
memory including instructions that, when executed by the at least one processor, cause the computing device to:
capture a first image by the front-facing camera;
detect a rotation of the computing device from a first position to a second position, the user being at least partially in a field of view of the rear-facing camera when the computing device is positioned in the second position;
activate the rear-facing camera;
set a minimum threshold for alignment based at least in part on the field of view of the rear-facing camera;
capture image data including a sequence of images by the rear-facing camera;
compare the first image with at least one of the sequence of images in the image data to provide feedback to a user, the feedback indicating when alignment between the first image and the image data is increasing;
detect that the alignment between the first image and the image data is within the minimum threshold for alignment when at least a minimum portion of the at least one of the sequence of images matches a corresponding portion of the first image; and
capture a second image using the rear-facing camera and persist the second image into non-volatile memory in response to detecting that the alignment between the image data and the first image has reached the minimum threshold for alignment.

2. The computing device of claim 1, further comprising:
a vibration device;
wherein the feedback includes one or more vibrations produced by the vibration device, the vibration device gradually increasing at least one of: intensity or frequency of the one or more vibrations as the degree of alignment between the image data and the first image is increasing.

3. The computing device of claim 1, further comprising:
an audio speaker;
wherein the feedback includes audio output produced by the audio speaker, the audio speaker gradually increasing at least one of: frequency or intensity of the audio output as the degree of alignment between the image data and the first image is increasing.

4. The computing device of claim 1, further comprising:
a light output device;
wherein the feedback includes light produced by the light output device, the light output device gradually increasing at least one of: frequency or intensity of the light as the alignment between the image data and the first image is increasing.

5. A computer implemented method, comprising:
under the control of one or more computer systems configured with executable instructions,
capturing a first image by a first camera of a computing device;
detecting a rotation of the computing device from a first position to a second position, a user being at least partially in a field of view of a second camera of the computing device when the computing device is positioned in the second position;
activating the second camera;
setting a minimum threshold for alignment based at least in part on the field of view of the second camera;
comparing the first image to image data being captured by the second camera, the image data including a plurality of images;
providing feedback indicating when alignment between at least a portion of the first image and at least one of the plurality of images in the image data is changing;
detecting that the alignment meets or exceeds the minimum threshold for alignment when at least a minimum portion of the at least one of the plurality of images matches the at least the portion of the first image; and
capturing a second image using the second camera and persisting the second image in memory.

6. The computer implemented method of claim 5, wherein comparing the first image to the image data being captured by the second camera further comprises:
performing normalized correlation between the at least the portion of the first image and the at least a portion of the at least one of the plurality of images in the image data captured by the second camera.

7. The computer implemented method of claim 5, wherein comparing the first image to the image data being captured by the second camera further comprises:
detecting that the first image contains a human face; and
performing facial recognition to identify one or more feature points on the human face and locations of the one or more feature points, wherein the locations of the one or more feature points in the first image is compared to the locations of the one or more feature points in the at least one of the plurality of images captured by the second camera.

8. The computer implemented method of claim 5, wherein providing the feedback further comprises:
providing the feedback corresponding to a movement of the second camera, the feedback indicating whether the alignment between the at least the portion of the first image and the at least one of the plurality of images in the image data is increasing, decreasing, or remaining substantially constant.

9. The computer implemented method of claim 5, wherein the feedback further includes one or more vibrations, audio output or light output.

10. The computer implemented method of claim 5, wherein the feedback further comprises one or more of:
vibration produced by a vibration device, the vibration device gradually increasing at least one of: intensity or frequency of the vibration as the alignment is increasing;
audio output produced by an audio speaker, the audio speaker gradually increasing at least one of: frequency or intensity of the audio output as the alignment is increasing; or
light produced by a light output device, the light output device gradually increasing at least one of: frequency or intensity of the light as the alignment is increasing.

11. The computer implemented method of claim 5, wherein the first camera is a front-facing camera on a portable computing device, and wherein the second camera is a rear-facing camera on the portable computing device, and
wherein capturing the second image further comprises activating at least one of: automatic focus, a flash device, or high dynamic rate (HDR) imaging of the rear-facing camera.

12. The computer implemented method of claim 5, further comprising:

cropping the second image to match dimensions of the first image if a field of view of the second camera is greater than the field of view of the first camera.

13. The computer implemented method of claim 5, wherein the second image is captured in response to detecting input of at least one button.

14. A computing device, comprising:
a first camera;
a second camera;
at least one processor; and
memory including instructions that, when executed by the at least one processor, cause the computing device to:
capture a first image by the first camera;
detect a rotation of the computing device from a first position to a second position, a user being at least partially in a field of view of the second camera when the computing device is positioned in the second position;
activate the second camera;
set a minimum threshold for alignment based at least in part on the field of view of the second camera;
compare the first image to image data being captured by the second camera, the image data including a plurality of images;
provide feedback indicating when alignment between at least a portion of the first image and at least one of the plurality of images in the image data is changing;
detect that the alignment meets or exceeds the minimum threshold for alignment when at least a minimum portion of the at least one of the plurality of images matches the at least the portion of the first image; and
capture a second image using the second camera and persist the second image into the memory.

15. The computing device of claim 14, wherein comparing the first image to the image data being captured by the second camera further comprises:
performing normalized correlation between the at least the portion of the first image and the at least a portion of the at least one of the plurality of images in the image data captured by the second camera.

16. The computing device of claim 14, wherein providing the feedback further comprises:
providing the feedback corresponding to a movement of the second camera, the feedback indicating whether the alignment between the at least the portion of the first image and the at least one of the plurality of images in the image data is increasing, decreasing, or remaining substantially constant.

17. The computing device of claim 14, wherein the feedback further includes one or more vibrations, audio output or light output.

18. The computing device of claim 14, wherein the feedback further comprises one or more of:
vibration produced by a vibration device, the vibration device gradually increasing at least one of: intensity or frequency of the vibration as the alignment is increasing;
audio output produced by an audio speaker, the audio speaker gradually increasing at least one of: frequency or intensity of the audio output as the alignment is increasing; or
light produced by a light output device, the light output device gradually increasing at least one of: frequency or intensity of the light as the alignment is increasing.

19. The computing device of claim 14, wherein the memory further includes instructions that, when executed by the at least one processor, cause the computing device to:
crop the second image to match dimensions of the first image if a field of view of the second camera is greater than the field of view of the first camera.

20. A non-transitory computer readable storage medium storing one or more sequences of instructions executable by one or more processors to perform a set of operations comprising:
capturing a first image by a first camera of a computing device;
detecting a rotation of the computing device from a first position to a second position, a user being at least partially in a field of view of a second camera of the computing device when the computing device is positioned in the second position;
activating the second camera;
setting a minimum threshold for alignment based at least in part on the field of view of the second camera;
comparing the first image to image data being captured by the second camera, the image data including a plurality of images;
providing feedback indicating when alignment between at least a portion of the first image and at least one of the plurality of images in the image data is changing;
detecting that the alignment meets or exceeds the minimum threshold for alignment when at least a minimum portion of the at least one of the plurality of images matches the at least the portion of the first image; and
capturing a second image using the second camera and persisting the second image into memory.

21. The non-transitory computer readable storage medium of claim 20, wherein comparing the first image to the image data being captured by the second camera further comprises:
performing normalized correlation between the at least the portion of the first image and the at least a portion of the at least one of the plurality of images in the image data captured by the second camera.

22. The non-transitory computer readable storage medium of claim 20, wherein providing the feedback further comprises:
providing the feedback corresponding to a movement of the second camera, the feedback indicating whether the alignment between the at least the portion of the first image and the at least one of the plurality of images in the image data is increasing, decreasing, or remaining substantially constant.

23. The non-transitory computer readable storage medium of claim 20, wherein the feedback further includes one or more vibrations, audio output or light output.

24. The non-transitory computer readable storage medium of claim 20, wherein the first camera is a front-facing camera on a portable computing device, and wherein the second camera is a rear-facing camera on the portable computing device, and
wherein capturing the second image further comprises activating at least one of: automatic focus, a flash device, or high dynamic rate (HDR) imaging of the rear-facing camera.

25. The non-transitory computer readable storage medium of claim 20, further comprising instructions for:
cropping the second image to match dimensions of the first image if a field of view of the second camera is greater than the field of view of the first camera.

* * * * *